(12) United States Patent
Durling

(10) Patent No.: US 6,359,377 B1
(45) Date of Patent: Mar. 19, 2002

(54) SPARK PLUG WITH ENGINE CYLINDER PRESSURE SENSOR

(75) Inventor: Harold E. Durling, Elsie, MI (US)

(73) Assignee: Savage Enterprises, Inc., Edina, MN (US)

( * ) Notice: Subject to any disclaimer, the term of this patent is extended or adjusted under 35 U.S.C. 154(b) by 0 days.

(21) Appl. No.: 09/243,093

(22) Filed: Feb. 2, 1999

(51) Int. Cl.[7] ............................................. H01T 13/20
(52) U.S. Cl. .................. 313/141 X; 313/118
(58) Field of Search ................ 313/140, 141, 313/129, 118, 142, 135

(56) References Cited

U.S. PATENT DOCUMENTS

| | | | |
|---|---|---|---|
| 4,393,687 A | * 7/1983 | Muller et al. ............... | 313/129 |
| 5,014,656 A | 5/1991 | Leptich et al. ............... | 123/169 |
| 5,405,280 A | 4/1995 | Polikarpus et al. ............. | 445/7 |
| 5,421,300 A | 6/1995 | Durling et al. ............. | 123/266 |
| 6,204,594 B1 | * 3/2001 | Ingham .................. | 313/141 X |

FOREIGN PATENT DOCUMENTS

WO    WO 97/31251    8/1997

OTHER PUBLICATIONS

P.W. Atkins, *Physical Chemistry*, Third Edition (1986), p. 770–772, 784–785.

* cited by examiner

*Primary Examiner*—Michael H. Day
*Assistant Examiner*—Joseph Williams
(74) *Attorney, Agent, or Firm*—Merchant & Gould P.C.

(57) ABSTRACT

A pressure-sensing ignition device (10) for use in a spark ignition system of an internal combustion engine. The device (10) generally includes a body (14) having a longitudinal axis of symmetry and an internal chamber (12). Disposed in the chamber (12) adjacent one end of the body (14) is an orifice (44) that vents the chamber (12) to the exterior of the body (14). An electrode (18) and an optical pressure transducer (24) are present within the body (14). An optical cable (22) is connected to the transducer (24) for transmitting an optical pressure signal. Means (20) is provided for conducting a current to the electrode (18) via the optical cable (22).

20 Claims, 1 Drawing Sheet

SPARK PLUG WITH ENGINE CYLINDER PRESSURE SENSOR

Field of the Invention

The present invention generally relates to spark plugs for ignition of an air/fuel mixture within a main combustion chamber of an internal combustion engine. In particular, this invention relates to a spark plug configured to allow engine cylinder pressure sensing without requiring modifications to the engine and without interfering with the intended performance of the spark plug.

BACKGROUND OF THE INVENTION

Spark ignition of an air/fuel mixture within a combustion chamber of an internal combustion engine typically involves igniting the air/fuel mixture with an electric spark jumped between an electrode and a ground electrode of a spark plug. This type of plug, conventionally used in spark ignition systems, produces a fixed flame "kernel" that relies on engine design to achieve suitable flame propagation within the combustion chamber. An alternative to spark ignition known in the art is torch jet-assisted spark ignition which, as taught by U.S. Pat. No. 3,921,605 to Wyczalek, U.S. Pat. No. 4,924,829 to Cheng et al., U.S. Pat. No. 5,405,280 to Polikarpus et al., and U.S. Pat. No. 5,421,300 to Durling et al., offers several advantages over spark ignition approaches. As the name suggests, torch jet-assisted spark ignition utilizes a jet of burning gases that are propelled into the combustion chamber in order to enhance the burning rate within the combustion chamber by providing increased turbulence as well as presenting a larger flame front area. As a result of a faster burning rate, lower cyclic variation in cylinder pressure is achieved, which enables a higher engine efficiency with a higher compression ratio.

Regardless of the type of spark plug used, much can be learned of their performance and that of the engines in which they are installed by measuring engine cylinder pressure. In the past, pressure transducers have been separately installed in engine cylinder heads, which requires removing the head, drilling and tapping a hole for the transducer, and then reinstalling the head on the engine. In view of the labor required with this approach, pressure-sensing spark plugs have been developed. Plugs of this type generally have larger diameters than standard spark plugs as a result of a pressure transducer, usually of the piezocrystal-type, being mounted externally to the plug body, making their installation impossible in some engines. The passage required to relay cylinder pressure to the transducer is necessarily narrow and long, which promotes distortion of the pressure signal transmitted through the passage due to through-passage resonance. As a result, the pressure profile that reaches the transducer can yield inaccurate output from the transducer.

A further disadvantage with prior art pressure-sensing spark plugs is the sensitivity of their electrical output to interference and even destruction from the high voltage spark current that is in close proximity. Misleading results from combustion tests using these plugs can also occur because the spark plug firing tip geometry must often by compromised to accommodate the transducer and its passage, causing the plug to not behave in the engine in the same way that a standard plug would.

From the above, it can be appreciated that an improved cylinder pressure sensing device and method would be desirable. Such a device would preferably be less susceptible to distortion of the pressure profile reaching the transducer, insensitive to interference from the high voltage spark current, and permit the use of standard firing tip geometries.

SUMMARY OF THE INVENTION

According to the present invention, there is provided a pressure-sensing ignition device for use in a spark ignition system of an internal combustion engine. The ignition device of this invention is configured as a torch jet spark plug, and can therefore serve to ignite an air/fuel mixture within a combustion prechamber within the plug, and then propel the resulting burning gases through an orifice and into the engine main combustion chamber to increase the burning rate of the air/fuel mixture within the combustion chamber. The spark plug has an uncomplicated design and exhibits improved performance by employing the prechamber as a passage to a pressure transducer housed entirely within the body of the plug.

The spark plug of this invention generally includes a body having a longitudinal axis of symmetry, first and second axial ends, and an internal chamber. The chamber has a first axial end and an oppositely-disposed second axial end, with its second axial end being at the second axial end of the body. Disposed at the second axial end of the chamber is an orifice that vents the chamber to the exterior of the body. An electrode and an optical pressure transducer are present within the body. An optical cable is connected to the optical pressure transducer for transmitting an optical pressure signal from the optical pressure transducer. Finally, means associated with the optical cable is provided for conducting a current to the electrode. For example, the optical cable can be provided with a conductor, such as a braided flexible metal sheath, on its exterior surface, which connects to a metallic enclosure on the exterior structure of the optical pressure transducer.

Based on the above construction, the transducer is entirely enclosed within the body of the plug, contrary to prior art pressure-sensing spark plugs that require an externally-mounted transducer. Preferably, the electrode is an annular-shaped center electrode at the first axial end of the chamber, and the optical pressure transducer is in fluidic communication with the chamber through a passage in the center electrode, so that a separate passage dedicated solely to transmitting cylinder pressure to the transducer is unnecessary. Another preferred aspect of the invention is that the optical pressure transducer and electrode are disposed in an axial through-passage within the plug body, a portion of which also defines the chamber.

The ignition device of this invention overcomes the disadvantages of prior art pressure-sensing spark plugs by its use of an internal chamber whose dimensions can be sufficiently generous to be relatively insusceptible to distortion of the pressure profile reaching the transducer. Because the transducer produces an optical signal, another advantage of the invention is that its operation and output are insensitive to interference from the high voltage spark current. Another advantage is that a variety of ground electrodes and firing tip geometries can be employed, including those specifically adapted for torch jet-assisted spark ignition. As a result, the present invention provides an engine cylinder pressure measuring capability to an otherwise standard-sized spark plug, such that the plug can be considered for use in many spark ignition engines. These advantages are not only beneficial to laboratory testing, but also can be employed for pressure-based engine control of a production engine.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE INVENTION

Figure 1:
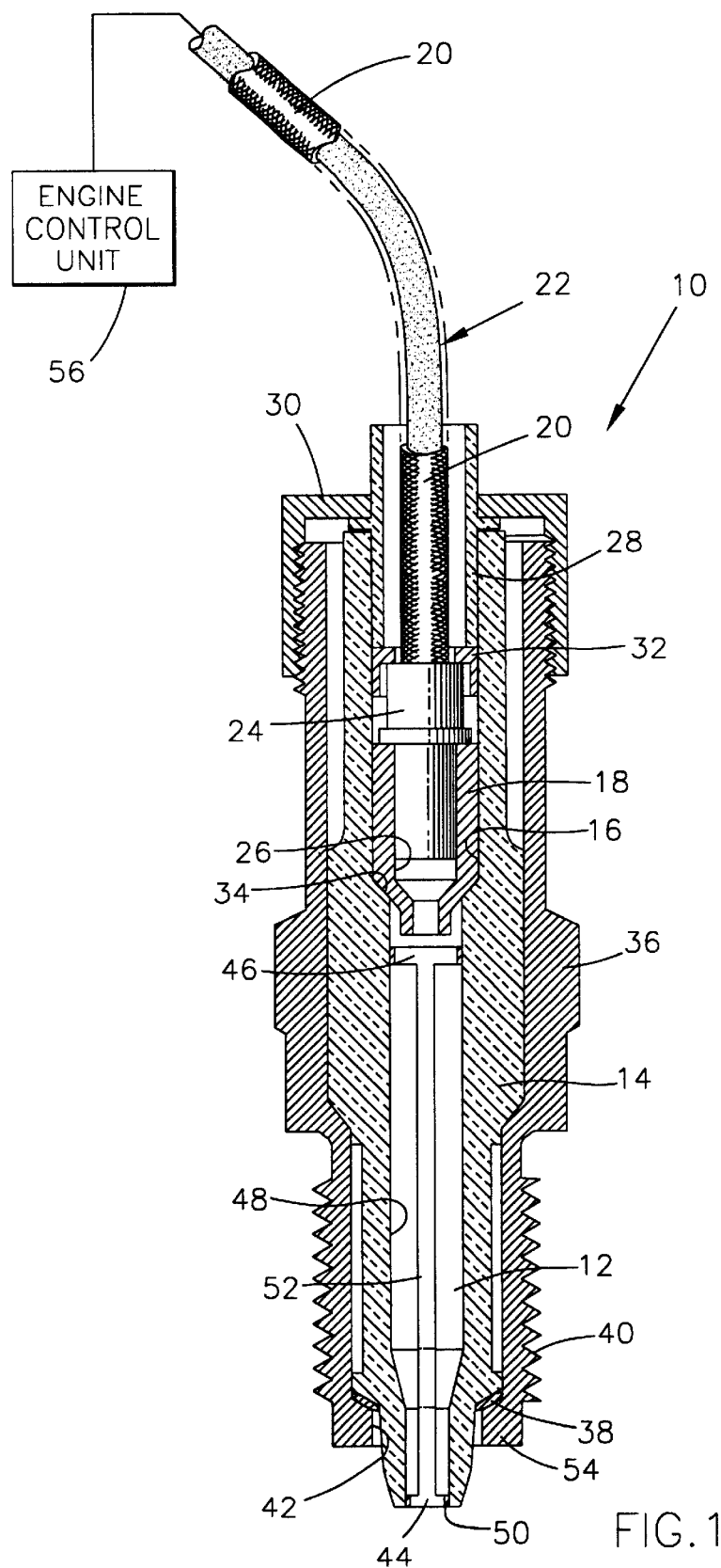
FIG. 1 shows a cross-sectional view along the longitudinal axis of a spark plug in accordance with this invention.

Shown in FIG. 1 is a spark plug 10 adapted to be installed as a component of a spark ignition system for an internal combustion engine. As depicted, the spark plug 10 is configured as a torch jet spark plug for use with torch jet-assisted ignition techniques, by which the plug 10 serves to increase the burning rate of an air/fuel mixture within a combustion chamber of an internal combustion engine by igniting an air/fuel mixture in a combustion prechamber 12 within an insulator body 14 of the plug 10. While those skilled in the art will recognize that the present invention is constructed to be particularly suitable for use in an automotive internal combustion engine, the teachings of the present invention are also applicable to other spark plug configurations, as well as other applications which utilize internal combustion processes for power generation.

As with spark plugs typically used with internal combustion engines, the insulator body 14 is preferably formed of a ceramic material, such as alumina ($Al_2O_3$). The body 14 has a longitudinal passage 16, a lower portion of which defines the prechamber 12. In an upper portion of the passage 16, an annular-shaped center electrode 18 is received, to which an electric voltage is supplied via a metal sheath 20 on the exterior of an optical cable 22. As known in the art, the optical cable 22 operates on the basis of total internal reflection resulting from the different refractive indices of the fiber core and a cladding material that surrounds the fiber core. As seen in FIG. 1, the metal sheath 20 is able to conduct an electric voltage to the center electrode 18 through the metallic shell of a fiber optic pressure transducer 24. The transducer 24 can be of any suitable type capable of producing an optical signal based on a pressure input. One such transducer is commercially available from Optrand Inc. and described as a"High Temperature Pressure Sensor."

As shown, the transducer 24 and center electrode 18 are aligned within the passage 16, with a portion of the transducer 24 protruding into a central passage 26 within the center electrode 18. The transducer 24 and passage 26 can be threaded to secure the transducer 24 to the electrode 18. Through the passage 26, pressure signals are transmitted directly from the prechamber 12 to the transducer 24. The passage 26 is short and of comparatively large diameter, which reduces pressure wave distortion and resonance problems associated with prior art pressure-sensing plugs.

With the transducer 24 axially located with the center electrode 18 within the insulator body 14, the overall size of the plug 10 is unchanged from a conventional spark plug. Furthermore, the optical pressure signal produced by the transducer 24 is unaffected by high voltage pulses, which allows the outer sheath 20 to conduct the high voltage spark pulses for the plug 10. As a result, signal interference is avoided with this invention, even though the optical cable 22 is used to transmit both the output signal from the transducer 24 and the high voltage spark current. By combining these functions, the overall size of the plug 10 is minimized.

As shown, the center electrode 18 and transducer 24 are retained within the passage 16 with a ceramic sleeve 28 that transfers a clamping force from a cap 30 to a collar 32 below the sleeve 28, which distributes a clamping force that maintains the center electrode 18 firmly seated on a tapered seat 34 within the passage 16. The cap 30 is threaded onto or otherwise secured to a metal shell 36 in which, as with spark plugs typically used with internal combustion engines, the body 14 of the plug 10 is installed and secured. A gasket 38 of a suitable temperature-resistant material, such as copper or soft steel, is present between the shell 36 and the insulator body 14 to create a gas-tight seal. External threads 40 formed at the lower end of the shell 36 are for the purpose of installing the spark plug 10 into a threaded portion of a spark plug well (not shown). The insulator body 14 projects through an opening 42 in the lower end of the shell 36 adjacent the threads 40.

The center electrode 18 is shown as protruding into the upper end of the prechamber 12, opposite an orifice 44 formed at the lower end of the body 14 and prechamber 12. An inner electrode 46 is disposed on the internal surface 48 of the prechamber 12 adjacent the center electrode 18, and an outer hollow electrode 50 is located on the wall of the orifice 44. The inner electrode 46 is in the form of an annular-shaped band that forms a radial inner spark gap with the center electrode 18. The hollow electrode 50 is also in the form of an annular-shaped band and is interconnected with the inner electrode 46 by a conductive "stripe" 52 on the surface 48 of the prechamber 12. As such, the hollow electrode 50 acts as an extension of the inner electrode 46, and forms one electrode of an outer spark gap, which will be described below. The stripe 52 and the inner and hollow electrodes 46 and 50 are preferably formed by an adherent metal coating on the internal surface 48 of the prechamber 12, such as in the manner taught by U.S. Pat. No. 5,421,300 to Durling et al. The inner and hollow electrodes 46 and 50 and the stripe 52 can be formed by a metal layer that substantially covers the entire internal surface 48 of the prechamber 12 below the center electrode 18 as taught by U.S. Pat. No. 5,405,280 to Polikarpus et al., such that an electrical capacitor is effectively formed. Various materials and processes can be used to form the electrodes 46 and 50 and stripe 52 in accordance with the teachings of Polikarpus et al. and Durling et al., both of which are incorporated herein by reference.

As shown in FIG. 1, the prechamber 12 is elongate and extends along the longitudinal axis of the insulator body 14. The orifice 44 vents the prechamber 12 to the main combustion chamber of an engine in which the spark plug 10 is installed, and therefore allows for the intake of the air/fuel mixture during the compression stroke as well as the expulsion of combustion gases upon ignition of the air/fuel mixture within the prechamber 12, which is initiated by the center and inner electrodes 18 and 46. While shown as being generally centrally located at the end of the body 14, the orifice 44 could be radial offset. The volume of the prechamber 12 and the area of the orifice 44 can be selected to provide the desired characteristics for a particular engine and effect that is of interest. For a given prechamber volume, a relatively small orifice diameter restricts the exit of gasses from the prechamber 12, causing higher prechamber pressures and higher velocity jets when the plug 10 is fired, while a relatively large orifice diameter results in lower velocity jets. Excessively small orifices 44 restrict filling of the prechamber 12 during the engine compression stroke, especially at high engine speeds. Larger prechamber volumes produce longer duration jets, but introduce additional surface area to the combustion chamber, which is undesirable from the standpoint of heat loss and emissions.

From the above, it can be seen that there is no single preferred orifice diameter and prechamber volume combination for all engines, and persons skilled in the art will recognize that there are potential advantages of various combinations. For illustrative purposes, one such combination which has been found to perform suitably involves the use of a prechamber 12 whose volume is on the order of about 0.2 to about 0.4 cubic centimeters, in combination with a central orifice 44 having a cross-sectional area of about 1.7 to about 3.8 square millimeters.

In the embodiment shown in FIG. 1, a ground terminal 54 is formed by an annular-shaped portion of the shell 36 surrounding the end of the insulator body 14 that protrudes from the shell 36. Together, the hollow electrode 50 and ground terminal 54 form an outer annular spark gap somewhat similar to the spark gap between the center and inner electrodes 18 and 46. Advantageously, the hollow electrode 50 of the plug 10 allows engine cylinder pressure to be transmitted to the transducer 24 without requiring any modifications to the geometry of the electrode 50 and ground terminal 54. While a particular ground electrode configuration is shown, a variety of configurations and firing tip geometries can be employed with the plug 10 of this invention, and this invention is not limited to ground electrodes that are specifically designed for torch jet-assisted spark ignition.

With the embodiment shown in FIG. 1, it can be seen that an electric voltage supplied to the spark plug 10 via the metal sheath 20 will generate an electric spark at the spark gap between the center and inner electrodes 18 and 46. The spark then ignites an air/fuel mixture charged in the prechamber 12 from the engine's main combustion chamber during the preceding compression stroke. Electric current is also then conducted along the metal stripe 52 to the hollow electrode 50, where a second spark is generated to ignite the air/fuel mixture within the main combustion chamber. Though combustion proceeds relatively simultaneously in both the prechamber 12 and the main chamber, the smaller relative volume of the prechamber 12 results in a high pressure being developed within the prechamber 12 while the pressure within the main combustion chamber is still relatively low. As a result, a jet which initially includes an unburned portion of the prechamber's air/fuel mixture will be expelled from the prechamber 12, become ignited by the external flame kernel of the outer spark gap, and then travel far into the main chamber, thereby significantly increasing the combustion rate within the main chamber.

The spark plug 10 of this invention is well suited for generating and optically transmitting cylinder pressure data to a data monitoring location outside of the plug 10. Alternatively, FIG. 1 schematically shows an engine control unit 56 that can be coupled to the optical cable 22 and its metal sheath 20 to enable pressure-based engine control of a test or production engine. Accordingly, in contrast with prior art pressure-sensing spark plugs, the plug 10 of this invention is not limited to experimental uses, but can be incorporated into a production engine control system.

While the invention has been described in terms of a preferred embodiment, it is apparent that other forms could be adopted by one skilled in the art. For example, appropriate materials could be substituted, and the teachings of this invention could be employed in different environments. Furthermore, though shown as being configured for a torch-jet assisted spark ignition system, the plug 10 is not required to be configured or operate to generate a torch jet. Accordingly, the scope of the invention is to be limited only by the following claims.

What is claimed is:

1. An ignition device comprising:

a body having an exterior, a longitudinal axis of symmetry, first and second axial ends, and a chamber within the body, the chamber having an orifice at the second axial end of the body for venting the chamber to the exterior of the body;

an electrode in the body;

an optical pressure transducer in the body;

an optical cable connected to the optical pressure transducer for transmitting an optical pressure signal from the optical pressure transducer; and means for conducting a current to the electrode.

2. An ignition device as recited in claim 1, wherein the electrode is an annular-shaped center electrode at an axial end of the chamber opposite the orifice, the center electrode having an axial passage therethrough.

3. An ignition device as recited in claim 2, wherein the optical pressure transducer is in fluidic communication with the chamber through the axial passage in the center electrode.

4. An ignition device as recited in claim 1, wherein the body further comprises an axial passage therethrough.

5. An ignition device as recited in claim 4, wherein the optical pressure transducer and the electrode are disposed in the axial passage and the chamber is defined by a portion of the axial passage.

6. An ignition device as recited in claim 5, wherein the electrode is an annular-shaped center electrode at an axial end of the chamber opposite the orifice, the center electrode having an axial passage therethrough.

7. An ignition device as recited in claim 6, wherein the optical pressure transducer is in fluidic communication with the chamber through the axial passage in the center electrode.

8. An ignition device as recited in claim 1, wherein the conducting means is a conductor on at least a portion of an exterior surface of the optical cable.

9. An ignition device as recited in claim 1, wherein the electrode is an annular-shaped center electrode at a first axial end of the chamber opposite the orifice, the ignition device further comprising;

an annular-shaped second electrode at the first axial end of the chamber and surrounding the electrode to form an annular-shaped gap therewith;

an annular-shaped third electrode within the orifice; and means within the chamber for electrically interconnecting the second and third electrodes.

10. An ignition device as recited in claim 1, further comprising means for controlling operation of an internal combustion engine using the optical pressure signal from the optical pressure transducer.

11. An ignition device comprising:

a body having an exterior, a longitudinal axis of symmetry, first and second axial ends, an axial passage, and a chamber defined within the body by a portion of the axial passage, the chamber having a first axial end and an oppositely-disposed second axial end, the second axial end of the chamber being at the second axial end of the body, the body having an orifice at the second axial end of the chamber for venting the chamber to the exterior of the body;

an electrode in the axial passage of the body and disposed at the first axial end of the chamber, the electrode having a passage therethrough;

an optical pressure transducer in the axial passage of the body, the optical pressure transducer being in fluidic communication with the chamber through the passage in the electrode;

an optical cable connected to the optical pressure transducer for transmitting an optical pressure signal from the optical pressure transducer; and means for conducting a current to the electrode.

12. An ignition device as recited in claim 11, wherein the electrode projects into the first axial end of the chamber.

13. An ignition device as recited in claim 11, wherein the axial passage of the body extends completely through the body.

14. An ignition device as recited in claim 11, wherein the electrode is an annular-shaped center electrode that projects into the first axial end of the chamber.

15. An ignition device as recited in claim 11, further comprising an annular-shaped electrode within the orifice.

16. An ignition device as recited in claim 11, wherein the conducting means is a conductive sheath surrounding the optical cable.

17. An ignition device as recited in claim 11, wherein the electrode is an annular-shaped center electrode at the first axial end of the chamber, the ignition device further comprising;

an annular-shaped second electrode at the first axial end of the chamber and surrounding the electrode to form an annular-shaped gap therewith;

an annular-shaped third electrode within the orifice;

means within the chamber for electrically interconnecting the second and third electrodes; and a ground electrode adjacent the third electrode and forming a gap therewith.

18. An ignition device as recited in claim 11, further comprising means for controlling operation of an internal combustion engine using the optical pressure signal from the optical pressure transducer.

19. An ignition device as recited in claim 18, wherein the ignition device is a torch jet spark ignition device.

20. An ignition device comprising:

a body having an exterior, a longitudinal axis of symmetry, first and second axial ends, an axial passage, and a chamber defined within the body by a portion of the axial passage, the chamber having a first axial end and an oppositely-disposed second axial end, the second axial end of the chamber being at the second axial end of the body, the body having an orifice at the second axial end of the chamber for venting the chamber to the exterior of the body;

an annular-shaped center electrode in the axial passage of the body and projecting into the first axial end of the chamber, the center electrode having a passage therethrough;

an optical pressure transducer in the axial passage of the body, the optical pressure transducer being in fluidic communication with the chamber through the passage in the center electrode;

an optical cable connected to the optical pressure transducer for transmitting an optical pressure signal from the optical pressure transducer;

a metal sheath surrounding the optical cable for conducting a current to the center electrode;

an annular-shaped second electrode at the first axial end of the chamber and surrounding the center electrode to form an annular-shaped gap therewith;

an annular-shaped third electrode within the orifice; and means within the chamber for electrically interconnecting the second and third electrodes.

* * * * *

UNITED STATES PATENT AND TRADEMARK OFFICE
CERTIFICATE OF CORRECTION

PATENT NO.    : 6,359,377 B1
DATED         : March 19, 2002
INVENTOR(S)   : Durling et al.

It is certified that error appears in the above-identified patent and that said Letters Patent is hereby corrected as shown below:

<u>Title page,</u>
Item [75], insert -- Joseph G. Ralph, Owosso, MI (US) -- after the first named inventor.

Signed and Sealed this

Second Day of July, 2002

Attest:

Attesting Officer

JAMES E. ROGAN
*Director of the United States Patent and Trademark Office*